June 5, 1945.　　　J. JANDASEK　　　2,377,555

TRANSMISSION

Filed Dec. 30, 1940

INVENTOR
Joseph Jandasek
BY
ATTORNEYS

Patented June 5, 1945

2,377,555

UNITED STATES PATENT OFFICE 2,377,555

TRANSMISSION

Joseph Jandasek, Detroit, Mich., assignor to Bendix Aviation Corporation, South Bend, Ind., a corporation of Delaware Application December 30, 1940, Serial No. 372,299

8 Claims. (Cl. 60—54)

This invention relates to transmissions and more particularly to a transmission adapted to operate as a fluid torque converter to transmit increased torque at slower speed or to operate as a fluid clutch to transmit power without torque multiplication.

In the operation of certain devices of this general nature it is customary to provide a guide wheel or reaction member which may be shifted into or out of a fluid circuit to transform the device to operate as a fluid torque converter or as a fluid clutch.

The position of the guide wheel or reaction member in the fluid circuit may be influenced by variations of fluid pressure developed in the fluid circuit as the device operates. When the guide wheel is withdrawn from the fluid circuit to operate the device as a fluid clutch, it is desirable that some means be provided to initiate movement of the reaction member into the fluid circuit when the turbine or driven member becomes overloaded whereupon it is desirable to transform the device to operate as a torque converter to multiply torque and transmit it at reduced speed.

An object of this invention is therefore to provide means associated with a movable reaction member to initiate movement of the reaction member into a power transmitting fluid circuit when the fluid reaction within the circuit approaches a substantially predetermined value accompanied by a decrease in the efficiency of the device while operating as a fluid coupling.

Another object of the invention is to provide means operable in one direction of rotation to exert an axial thrust on a reaction member of a fluid unit to initiate movement of the reaction member into a fluid circuit when fluid reaction within the fluid circuit drops to a substantially predetermined value.

A further object resides in the provision of a plurality of small vortices interposed between relatively movable members operative to exert an axial thrust to move one of the members from the other when the members rotate relative to each other at a substantially predetermined speed.

Another object of the invention resides in the provision of relatively rotatable reaction and impeller members having cooperating means therebetween to exert axial thrust to separate the members when they are juxtaposed and rotating relative to each other at substantially predetermined speed.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views.

Figures 1, 2:
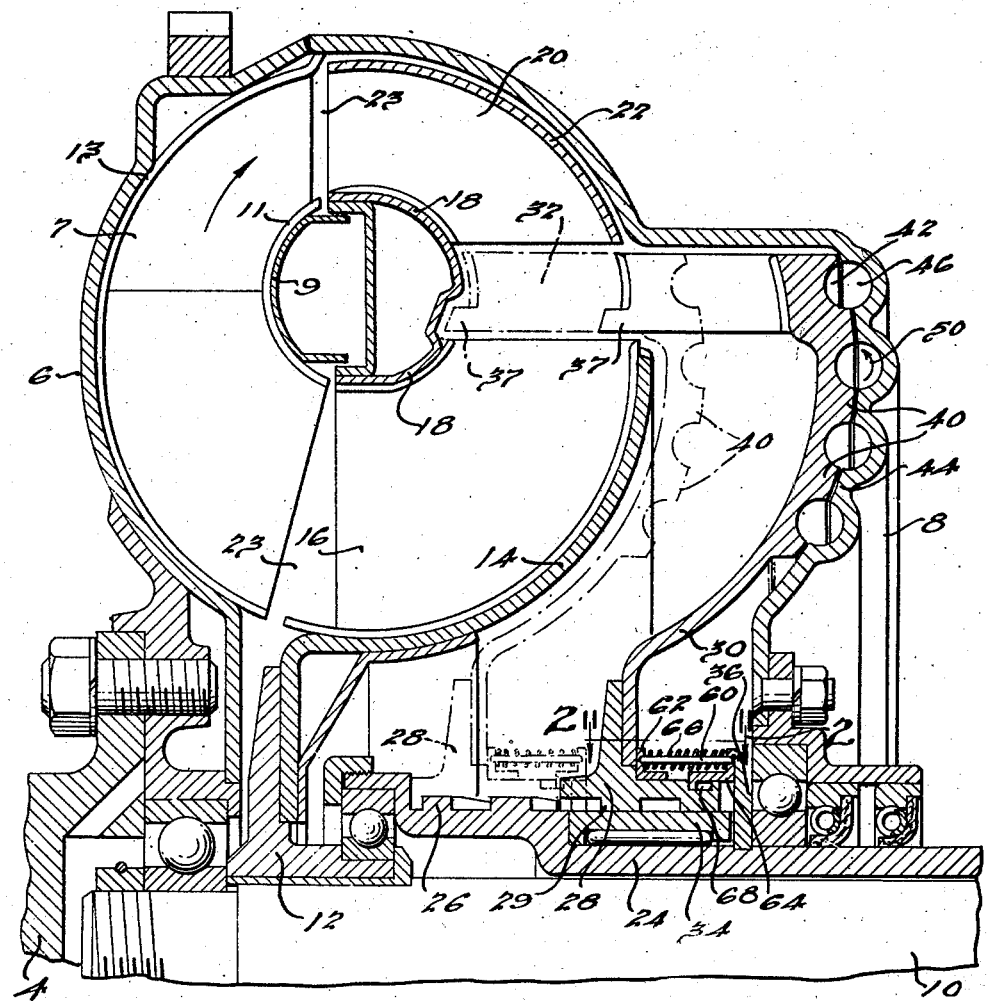
Fig. 1 is a side elevational view of a transmission embodying the present invention.
Fig. 2 is a sectional view taken substantially on the line 2—2 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Fig. 1, it will be observed that a driving shaft 4 is provided with an impeller housing 6 having impeller blades 7 and an impeller shroud 9. The impeller blades 7 are provided with flanges 11 which may be suitably fastened to the shroud 9. The blades 7 are also provided with flanges 13 secured to the housing 6. The housing 6 has a substantially radially extended portion 8 concentrically mounted on a driven shaft 10.

The driven shaft 10 carries a turbine including a hub 12 supporting a web 14 having thereon vanes 16 supporting a shroud 18 and the shroud 18 carries a plurality of vanes 20 supporting a shroud 22. The vanes 16 and 20 are connected to the webs 14 and 22 and to the shroud 18 by any suitable means. The impeller and turbine cooperate to form a power transmitting fluid circuit 23.

A stationary sleeve 24 concentrically mounted relative to the driven shaft 10 has a helically threaded portion 26. A guide wheel hub 28 having helical threads 29 is mounted on the helical threads 26 of the stationary member 24, and is movable axially thereon.

The guide wheel hub 28 supports a web 30 having thereon vanes 32 adapted to be moved into and out of the fluid circuit 23 between the turbine vanes 16 and 20. A suitable bearing 34 mounted on the stationary member 24 may, if desired, be provided for the reception of the hub 28 of the guide wheel as it is shifted axially to remove the vanes 32 from the fluid circuit 23 and to permit the guide wheel to rotate freely in one direction so as to transform the device to operate as a fluid clutch, and a stop member 36 may be provided to limit outward movement of the hub 28 on the stationary member 24.

It will be observed that the guide wheel vanes 32 are provided with an axially extended tab 37 adapted to extend slightly into the power transmitting fluid circuit when the guide wheel is withdrawn from the circuit as illustrated in Fig. 1.

When the device is operating as a fluid clutch with the reaction member in the retracted position as illustrated in full lines in Fig. 1, the fluid circulating in the power transmitting circuit 23 does not exert a force on the tabs 37 of the reaction member to urge the reaction member to shift axially on the stationary member into the fluid circuit. When the turbine becomes overloaded or the efficiency of transmission of power as a fluid clutch decreases to a substantially predetermined value, the fluid circulating in the circuit 23 exerts a force on the projections 37 and the reaction member is rotated in the reverse direction. Reverse rotation of the reaction member actuates the auxiliary means employed to initiate movement of the guide wheel member hereinafter described to shift the guide wheel member axially toward the fluid circuit to engage the threads 29 of the hub 28 with the threads 26 of the stationary member 24. Continued reverse rotation of the guide wheel member shifts it into the fluid circuit whereupon the device is transformed to operate as a fluid torque converter.

The guide wheel web 30 is provided, preferably on its outer face, with a plurality of generally circumferentially extending ribs 40 defining generally semi-annular shaped channels 42 therebetween. The radially extended flange 8 of the impeller housing 6 is also formed with a plurality of generally circumferentially extended ribs 44 defining generally semi-annular shaped channels 46 therebetween.

In the operation of this device power applied to the driving shaft 4 is employed to energize a power transmitting fluid and circulate the fluid in the power transmitting fluid circuit 23. Energy is absorbed from the circulating fluid by the turbine vanes 20 and 16 and is transmitted through the web 14 and hub 12 to drive the driven shaft 10.

When the guide wheel vanes 32 of the reaction member are introduced into the power transmitting fluid circuit 23 the device operates as a torque converter to transmit power at increased torque. When the guide wheel vanes 32 are retracted from the fluid circuit, the device operates as a fluid clutch or a fluid coupling to transmit power at substantially no torque multiplication.

When the device is operating as a fluid clutch the ribs 40 and 44 on the webs of the reaction and impeller members 30 and 8 respectively lie closely adjacent each other with the channels 42 and 46 in oppositely disposed relation as illustrated in full lines in Fig. 1. When the device is operating, the power transmitting fluid fills at least a portion of these channels. When the impeller housing 8 rotates at a substantially predetermined speed relative to the reaction web member 30, which may if desired be free to rotate in the direction of the impeller and turbine members, fluid will be energized by frictional contact with the walls forming the channels 46 to direct the fluid outwardly in the direction of the arrow 50. The fluid then impinges against the walls forming the channels 42 of the reaction web member 30. The channels 46 and 42 thus act as small vortices or impeller and turbine members to exert lateral thrust on the reaction web member 30 urging the guide wheel vanes 32 towards the power transmitting fluid circuit 23.

Attention is at this point called to the fact that when the difference of the speed of rotation of the impeller housing 6 relative to the guide wheel approaches a substantially predetermined speed while the device is operating as a fluid clutch with the guide wheel flange 30 in the position shown in full lines, fluid pressure is developed in the channels 46 and 42 to urge the guide wheel flange member 30 axially on the stationary member 24 to introduce the guide wheel vanes 32 into the fluid circuit thereby initiating the transformation of the device to operate as a torque converter.

If desired, means associated with the guide wheel flange may be provided to engage the stop member 36 and exert a force to urge the guide wheel member toward the fluid circuit when the fluid reaction developed within the circuit tends to rotate the guide wheel member in a direction opposite the direction of rotation of the impeller and turbine. One desirable structure of such an actuating means may comprise a plurality of generally angularly disposed thrust pins 60 interposed between axially spaced cage members 62 and 64. Some of the thrust pins 60 may be provided with light coiled springs 66 as illustrated in Fig. 2.

In the operation of this device, when the reaction member is withdrawn from the fluid circuit to operate the device as a fluid clutch as illustrated in solid lines in Fig. 1, and in dotted lines in Fig. 2 the cage member 64 engages the stop member 36. The cage member 64 has a limited axial and annular movement determined by a lug on the member movable in the slot 68 of the hub 28. The thrust pins 60 and springs 66 collapse as illustrated in dotted lines in Fig. 2. The springs 66 yieldingly urge the cage member 64 into engagement with the stationary member 36, and when in the clutch operating position a slight force is exerted to urge the hub 28 axially to initiate shifting movement of the guide wheel into the power transmitting fluid circuit. The guide wheel member is then free to rotate on the bearing 34 freely in the direction of rotation of the impeller and turbine members to operate the device as a fluid clutch. If the turbine member becomes overloaded, the fluid reaction within the power transmitting fluid circuit 23 exerted against the tabs 37 on the vanes 32 tends to rotate the guide wheel flange 30 in the direction opposite to the direction of rotation of the device. The cage member 64 then frictionally engages the stop member 36 to restrain the cage member 64 from moving backwardly relative to the stop member 36. Since the cage member 62 rotates with the guide wheel hub 28, due to frictional contact therewith, movement of the guide wheel flange 30 angularly in the reverse direction moves the cage member 62 rotationally in the direction opposite the direction of rotation of the device relative to the cage member 64 whereupon the thrust pins 60 are moved angularly toward the full line positions illustrated in Fig. 2 toward axial alignment with the stationary member 24 and driven member 10. An axial thrust is then exerted on the cage member 62 and guide wheel hub 28 to urge the guide wheel hub and flange members axially a short distance to engage the internal helical threads 29 of the hub 28 with the external helical threads 26 of the stationary member 24. As soon as these helical threads engage, fluid reaction within the power transmitting fluid circuit 23 exerted on the guide wheel 32 urges the guide wheel to rotate reversely and the helical threads move the guide wheel 32 into the power transmitting fluid circuit. As the guide wheel 32 moves into the fluid circuit as illustrated in dotted lines in Fig. 1, the device is transformed to operate as a torque converter to multiply torque and transmit power at lower speed.

It will be understood that the channels 42 and 46 in the guide wheel and impeller 30 and 8 respectively, and the thrust pins 60 illustrated in Fig. 2, are merely illustrative examples of various means whereby the guide wheel member may be initially moved axially relative to the stationary member 24 or driven shaft 10 when the fluid reaction within the power transmitting fluid circuit exerts a force on the guide wheel member to move it in the reverse direction of rotation over the direction in which it rotates when the device is operating as a clutch. If desired, both the channels 42 and 46 and the strut members 60 may be employed simultaneously in a single device.

I claim:

1. A transmission comprising an impeller and a turbine providing in conjunction with one another a power transmitting fluid circuit, a guide wheel adapted to be spiral into and out of the circuit, mechanical means including thrust pins and springs initially urging the reaction member into the fluid circuit, and fluid passage means augmenting the mechanical means when fluid reaction in the fluid circuit causes the guide wheel to rotate reversely to the direction of rotation of the impeller and turbine.

2. A transmission comprising an impeller and a turbine providing in conjunction with one another a power transmitting fluid circuit, a guide wheel adapted to spiral into and out of the fluid circuit, mechanical means including thrust pins and springs sleeved on the pins imposing an axial thrust on the guide wheel when it is retracted position, and fluid pressure means for augmenting the mechanical means when fluid reaction in the fluid circuit causes the guide wheel to rotate reversely to the direction of rotation of the impeller and turbine.

3. A transmission comprising a fluid energizing impeller, an energy absorbing turbine cooperating with the impeller to provide a power transmitting fluid circuit, a guide wheel adapted to spiral into and partly out of the fluid circuit, thrust pins movable transversely with respect to the axis of the guide wheel for imposing an axial thrust on the guide wheel when in its retracted position, and toroidal fluid circuits between the impeller and the guide wheel effective to augment the axial thrust on the guide wheel upon the occurrence of fluid reaction in the fluid circuit causing rotation of the guide wheel reversely to the direction of rotation of the impeller and turbine.

4. A fluid operated transmission comprising a rotatable housing, an impeller carried by the housing for energizing fluid, an energy absorbing turbine in the housing and cooperating with the impeller to provide a power transmitting fluid circuit, a guide wheel adapted to spiral into and substantially out of the fluid circuit, a plurality of toroidal circuits between the housing and the guide wheel effective to impart an axial thrust on the guide wheel when fluid reaction occurs in the circuit resulting in rotation of the guide wheel reversely to the direction of rotation of the impeller and turbine members.

5. A transmission comprising an impeller for energizing fluid, a turbine for absorbing energy from the fluid providing in conjunction with one another a power transmitting fluid circuit, a guide wheel adapted to spiral into and substantially out of the fluid circuit, a ring carried by and frictionally engaging the guide wheel, a second ring carried by the guide wheel having limited angular and axial movement, and thrust pins supported between the rings transversely with respect to the axis of the guide wheel and ring.

6. A transmission comprising an impeller for energizing fluid, and a turbine for absorbing energy from the fluid providing in conjunction with the impeller a power transmitting fluid circuit, a guide wheel adapted to spiral into and substantially out of the fluid circuit, a ring having limited angular and axial movement on the guide wheel, thrust members supported between the guide wheel and ring transversely with respect to the axis of the guide wheel, and a stop for the ring.

7. A transmission comprising an impeller for energizing fluid, a turbine for absorbing energy from the fluid cooperating with the impeller to provide a power transmitting fluid circuit, a stationary member, a guide wheel adapted to spiral into and substantially out of the circuit and to rotate when out of the circuit, a member mounted on the guide wheel for limited rotation and axial movement, thrust pins supported between the guide wheel and the member transversely with respect to the axis of the guide wheel, and a stop on the stationary member providing an abutment for the member when the guide wheel is in position for free rotation.

8. A transmission comprising an impeller for energizing fluid, a turbine for absorbing energy from the fluid providing in conjunction with the impeller a power transmitting fluid circuit, a stationary member, a guide wheel adapted to spiral into and substantially out of the circuit and to rotate when substantially out of the circuit, a ring mounted for slight rotation and limited axial movement on the guide wheel, thrust pins supported between the guide wheel and the ring transversely with respect to the axis of the guide wheel, and a stop on the stationary member for engagement with the ring when the guide wheel is in position for free rotation.

JOSEPH JANDASEK.